United States Patent [19]

Baversten

[11] Patent Number: 5,321,732
[45] Date of Patent: Jun. 14, 1994

[54] CONTROL ROD HOUSING SUPPORT BARS WITH RADIATION SHIELDS

[75] Inventor: Bengt I. Baversten, Weatogue, Conn.

[73] Assignee: Combustion Engineering Inc., Windsor, Conn.

[21] Appl. No.: 92,063

[22] Filed: Jul. 16, 1993

[51] Int. Cl.$^5$ .............................................. G21C 19/00
[52] U.S. Cl. ...................................... 376/463; 376/219; 376/239; 376/277; 376/287
[58] Field of Search ................ 376/463, 287, 219, 239, 376/277

[56] References Cited

U.S. PATENT DOCUMENTS

| | | | |
|---|---|---|---|
| 4,752,434 | 6/1988 | Savarg | 376/239 |
| 4,820,058 | 4/1989 | Wilson et al. | 376/277 |
| 4,859,409 | 8/1989 | Matusz et al. | 376/463 |
| 4,888,149 | 12/1989 | Bryan | 376/287 |

*Primary Examiner*—Donald P. Walsh
*Assistant Examiner*—Frederick H. Voss
*Attorney, Agent, or Firm*—Ronald P. Kananen; John H. Mulholland

[57] ABSTRACT

A boiling water reactor control rod drive housing support bars having radiation shields to limit the travel of a control rod in the event that a control rod housing is ruptured and protect persons working under the reactor vessel from radiation exposure. The radiation shield includes radiation shield cups for surrounding the bottom portion of a control rod drive. The radiation shield cups are placed on support bars located in rows on opposing sides of the control rod drives. The radiation shield may be easily raised and lowered automatically by the control rod drive installation/removal machine.

21 Claims, 6 Drawing Sheets

CONTROL ROD HOUSING SUPPORT BARS WITH RADIATION SHIELDS

BACKGROUND OF THE INVENTION

1. Field of the Invention

This invention relates to supports and, more particularly, to boiling water reactor control rod drive housing supports. Still more particularly, this invention relates to control rod drive housing support bars with radiation shields.

2. Description of the Prior Art

In boiling water rectors the control rod drive housing supports are generally located underneath the reactor vessel near the control rod housings. The control rod drive housing supports limit the travel of and support a control rod in the event that a control rod drive housing is ruptured. The supports prevent a nuclear excursion as a result of a housing failure, thus protecting the fuel barrier.

Typically, control rod drive housing supports consist of hanger rods that are attached and supported at their upper end at a beam structure immediately underneath the reactor pressure vessel and support bars which are bolted between the hanger rods below the control rod drives. Another grid of bars is installed on the support bars to transfer the load of a ruptured control rod drive housing to the support bars. Generally, a pair of grid bars support each control rod drive. Each pair of grid bars are held together by two grid clamps and a bolt.

In this support system of the prior art, when it is necessary to change or replace a control rod drive, the grid bars must be removed. In order to remove the grid bars the operator must manually unscrew the grid clamp bolt, remove the two grid clamps and then remove the grid bars, each weighing approximately forty pounds. The number of grid bars which must be removed depends on the number of control rods which must be replaced. Furthermore, since the grid bars are interlocking, they must be removed starting from the outer peripheral row.

Thus, if a large number of control rod drives must be replaced or if an inner control rod drive must be replaced, a large number of grid bars must be removed. The result is a time consuming and cumbersome process. Moreover, as the grid bars are heavy and awkward to handle, a dropped bar could result in serious injury. Further still, the persons handling the grid bars or working under the reactor pressure vessel are subject to substantial radiation doses. The more time a person must spend replacing the control rod drives, therefore, the more that person is subject to radiation.

Thus it is a problem in the prior art to adequately support a control rod drive housing in a boiling water reactor while allowing for quick and easy replacement of control rod drives and reducing and minimizing the radiation exposure of a person working under the reactor pressure vessel.

SUMMARY OF THE INVENTION

It is an object of the present invention to support a control rod drive housing in the event that a control rod housing is ruptured while allowing for quick and easy replacement of a control rod drive.

It is another object of the present invention to provide a control rod drive housing support which minimizes the amount of radiation which a person is subject to when replacing a control rod drive or working under the reactor pressure vessel.

It is another object of the present invention to provide a control rod drive housing support which can be removed automatically.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, the control rod drive housing support of this invention may comprise a first means for supporting a control rod drive in the case of a housing failure; and second means for supporting the control rod drive in the case of a housing failure and shielding persons working under the reactor vessel from radiation, the second means being supported by the first supporting means, and wherein the second means can be automatically raised and lowered from a non-support position where the control rod drive is not supported to a support position where the control rod drive is supported.

Further, the first supporting means may comprise a plurality of support members provided in rows on opposing sides of a lower portion of a plurality of control rod drives and the second supporting means may comprise a plurality of support cups, each of the support cups receiving, and shielding a lower portion of the control rod drive and supporting the control rod drive in the case of a housing failure.

BRIEF DESCRIPTION OF THE DRAWINGS

The accompanying drawings, which are incorporated in, and form a part of, the specification, illustrate an embodiment of the present invention and, together with the description, serve to explain the principles of the invention. In the drawings.

DETAILED DESCRIPTION OF THE PREFERRED EMBODIMENT

Reference will now be made in detail to the preferred embodiment of the invention, an example of which is illustrated in the accompanying drawings.

Boiling water reactors use control rods in the reactor vessel for controlling the reaction therein. The control rods are generally contained in a grid-like fashion in a control rod housing with a drive unit for raising the control rods into the assembly of the fuel rods. Located underneath the reactor vessel near the control rod housings are control rod drive housing supports for limiting the travel of a control rod in the event that a control rod housing is ruptured.

Figure 1:
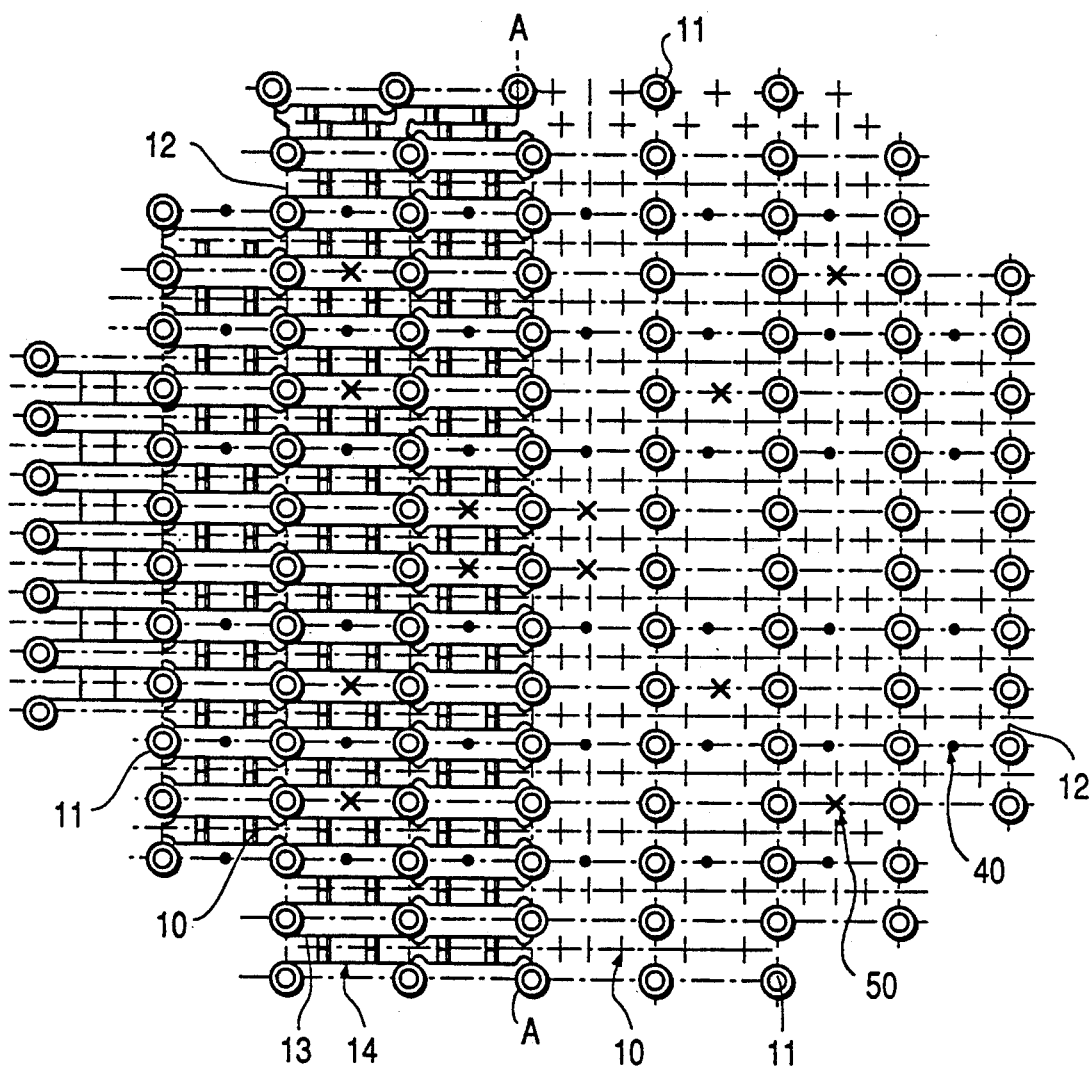
FIG. 1 is a top schematic view of the control rod drive housing support bars of the prior art.

A top view of the control rod drive housing supports of the prior art is shown schematically in FIG. 1. The positions shown at 10 correspond to a control rod drive position. The control rod drive housing supports of the prior art consist of hanger rods 11 supported by a beam underneath the reactor pressure vessel (not shown) spaced throughout the grid of control rod drive positions. Support bars 12 are bolted between the hanger rods 11. Grid bars 13 are installed on the support bars 12 to support the control rod drive and transfer the load of the control rod drive to the support bars 12. Generally, a pair of grid bars 13 support each control rod drive. Each pair of grid bars is held together by two grid clamps 14 and a bolt (not shown).

In FIG. 1, the control rod drive housing supports of the prior art is shown to the right of line A—A only with the support bars 12 and is shown with the support bars 12 and grid bars 13 to the left of the line A—A. In actual operation, the grid bars 13 would be used throughout the entire housing supports. In order to replace a control rod drive, using this prior art control rod drive housing supports, the grid bars 13 and clamps 14 must be removed. Because the grid bars 13 are interlocking, they must be removed starting from the periphery, resulting in a cumbersome and time consuming process.

Figure 2:
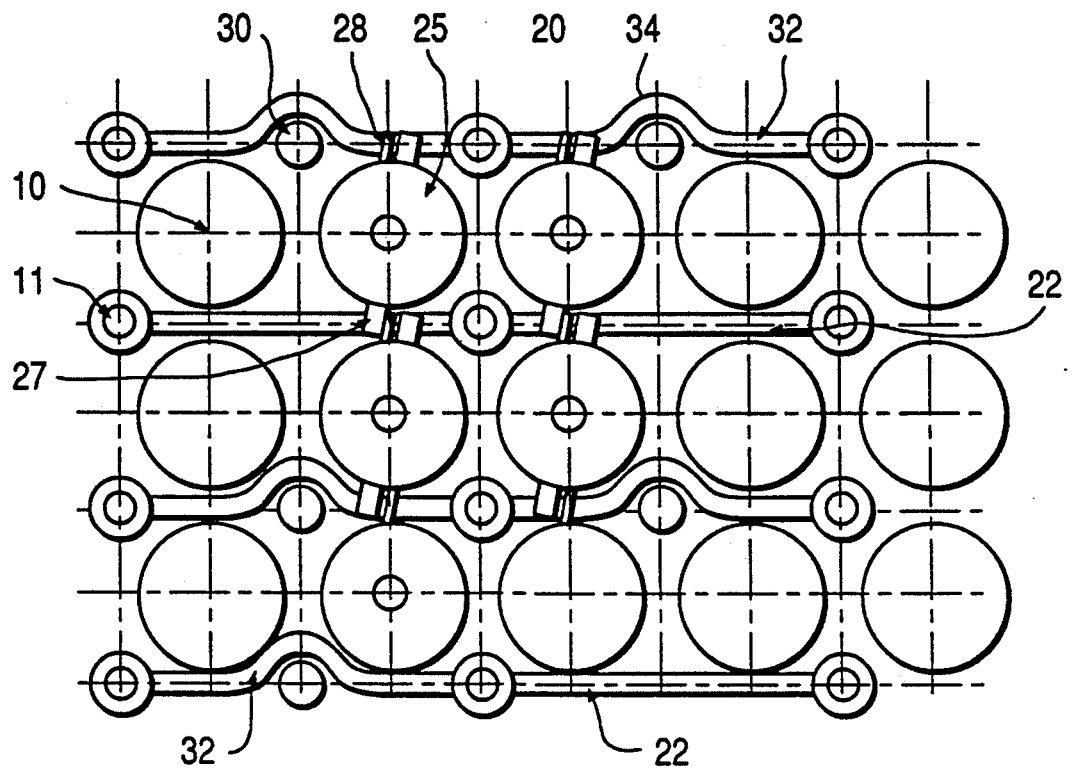
FIG. 2 is a top view of the control rod drive housing support bars with radiation shields of the present invention.
Figure 3:
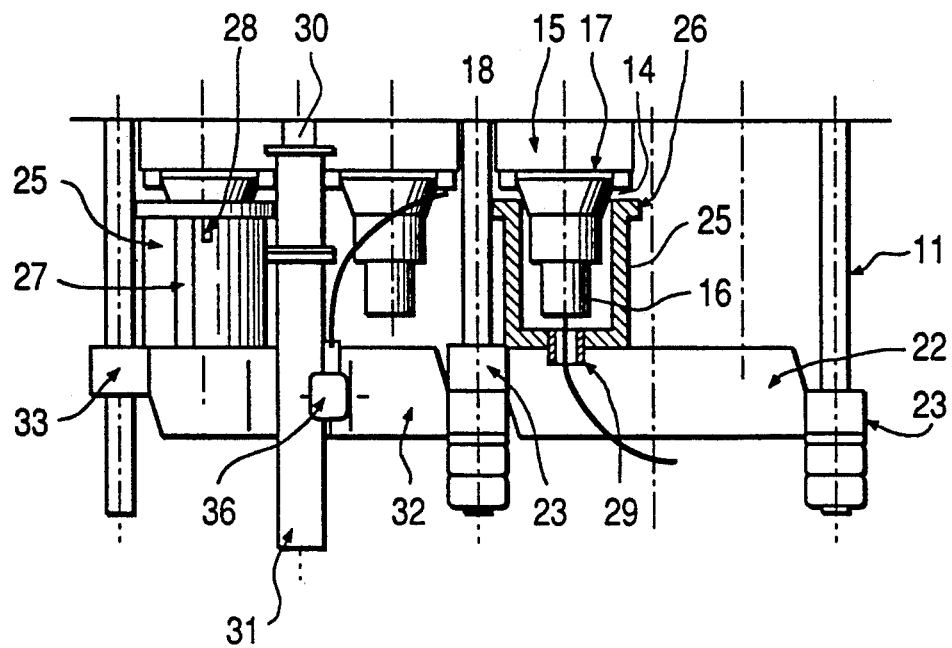
FIG. 3 is a side view of the control rod drive housing support bars with radiation shields of the present invention.
Figure 4:
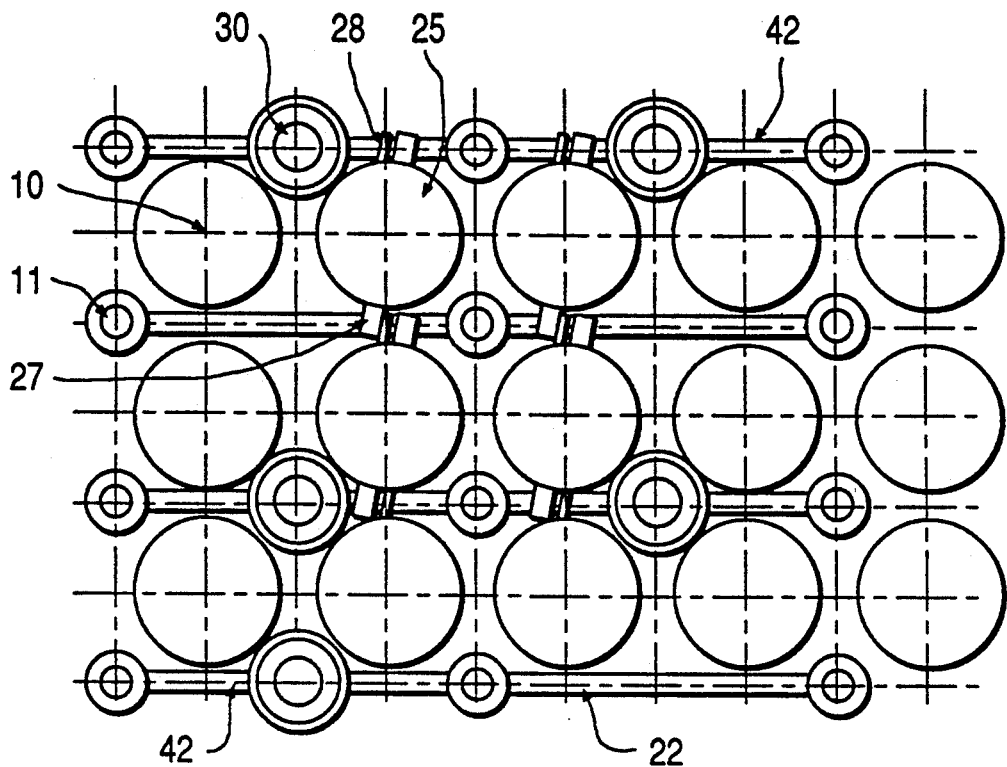
FIG. 4 is a top view of another embodiment of the control rod drive housing support bars with radiation shields of the present invention.
Figure 5:
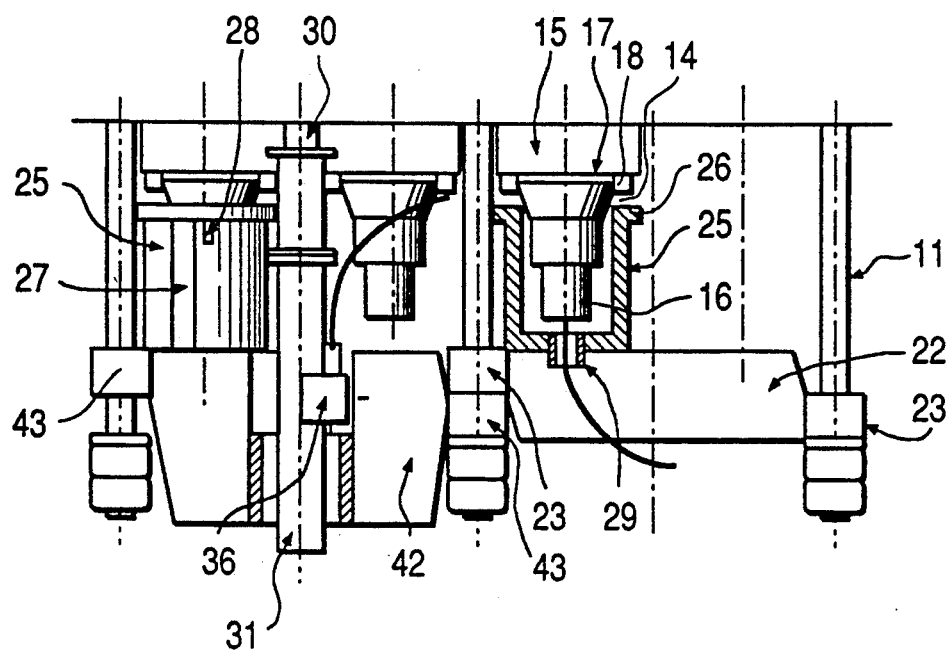
FIG. 5 is a side view of the control rod drive housing support bars with radiation shields of FIG. 4.
Figure 6:
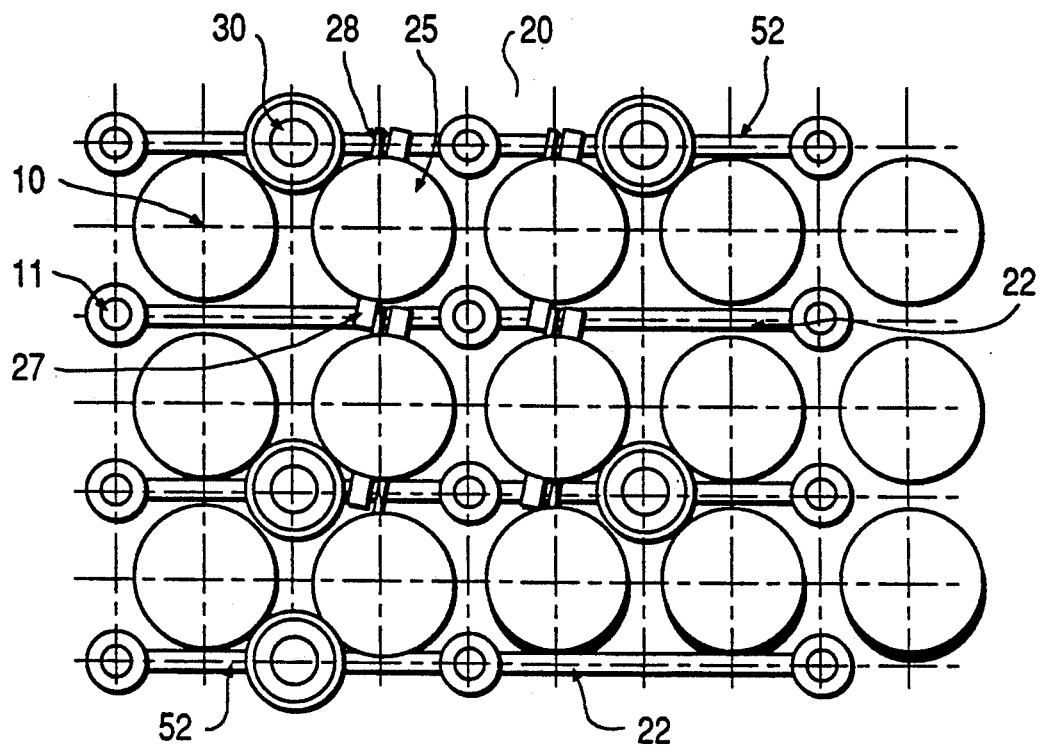
FIG. 6 is a top view of another embodiment of the control rod drive housing support bars with radiation shields of the present invention.

With reference to FIGS. 2 and 3, the control rod drive housing supports of the present invention will be described. The control rod drive positions and hanger rods are again shown at 10 and 11, respectively. However, the grid bars 13 and clamps 14 of the prior art are replaced with radiation shields 25 which both supports the control rod drive in the case of control rod drive housing rupture and provides radiation protection for the personnel working under the reactor pressure vessel. Moreover, the design of the radiation shields 25 are such that they can be easily handled and removed by a control rod drive removal/installation machine. Thus, all awkward and dangerous, manual handling of the control rod drive and supports as with the grid bars of the prior art is eliminated. Further, changing of the control rod drives is much easier and faster. Moreover, the radiation shields protect the personnel working under the reactor pressure vessel from exposure to radiation.

Figure 8A:
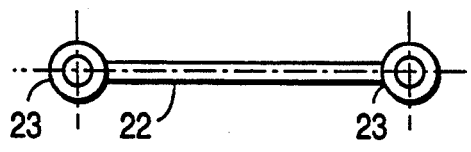
FIG. 8A is a top view of a support bar used with the support assembly shown in FIGS. 2 and 3.
Figure 8B:
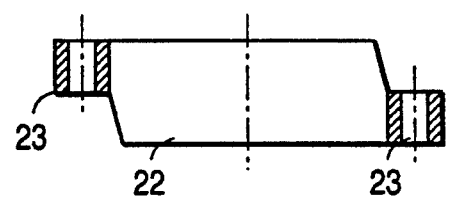
FIG. 8B is a cross-sectional side view of the support bar of FIG. 8A.

In the present invention the support bars 12 of the prior art are replaced with support bars 22 or support bars 32 placed in rows along opposing sides of the control rod drive positions and are oriented ninety degrees to the old bar support bars 12. An end of each support bar 22 is supported on a hanger rod 11 through a hub 23. The support bar 12 and hubs 23 are shown in FIGS. 8A and 8B. Typically, the support bars 12 of the prior art were one foot long. The length of support bars 22 of the present invention may vary depending on the reactor and the placement of the hangers. Preferably, the length of the support bars 22 is two feet.

As shown in FIGS. 2 and 3, the support assembly of the present invention is comprised of radiation shields 25 in the shape of cups interlocked together. The radiation shield cups 25 surround a bottom portion 16 of a control rod drive 15 beneath a flange 17 and flange bolts 18 on the control rod drive. A rim 26 is provided on the radiation shield cups to support the flange 17 or flange bolt 18 of the control rod drive 15 in the case of a housing rupture. The cups 25 include an opening 29 for passage of an electric cord of the control rod drive 15 and connection to the control rod drive installation/removal machine. The radiation shield cups 25 are each provided with tabs 28 on opposing sides. A tab 28 on a shield cup 25 interlocks with a tab 28 on an adjacent shield cup 25, thereby locking the shield cups 25 together.

The radiation shield cups 25 are supported on the support bars 22 through radiation shield support bars 27. Two support bars 27 at one end thereof support opposing sides of a radiation shield cup 25 through the rim 26. The support bars 22 support the other end of the radiation shield support bars 27. The support bars 22, in turn, are installed on the hangar rods 11 through hubs 23.

Prior to operation of the plant, the radiation shield 25 is lifted into position by the mast of the control rod drive removal/installation machine and when at the appropriate height, it is turned 45° and locked in position on top of the support bars 22. When the radiation shield 25 is removed by the control rod drive removal/installation machine, it is turned 45° and unlocked and lowered to a position where it may easily be manually lifted and moved to the side. As a result, considerable time is saved and workers are subject to considerably less radiation compared to the handling of the grid bar supports of the prior art.

The radiation shield cups 25 are provided below the control rod drive flange bolt 18 with some clearance to allow for thermal expansion of the control rod drive when the plant is in operation. As a result, a gap 34 exists between the control rod drive flange 17 and flange bolt 18 and the radiation shield cups 25. The gap 34 must be sufficient to allow the control rod drive 15 to expand as the system heats up during operation, preferably three quarters of an inch.

When the plant is in operation, the control rod drive 15 expands and the gap 34 between the flange 17 and the bolt 18 and the cups 25 is reduced so that the flange bolt 18 and cups 25 are almost touching. Preferably, the gap is reduced to about one quarter of an inch. As a result, the radiation shield cup 25 cannot move when the plant is in operation and is thereby further locked into position. When a control rod drive must be replaced or serviced, the operation of the plant is stopped and the plant cools down. As the control rod drives reduce in size and the gap between the flange 17 and flange bolt 18 and the radiation shield cups 25 increases to its original clearance. At such clearance the radiation shield 25 may be lowered to a non-operating position.

Additionally, notches can be provided between the radiation shield cups 25 and the support bars to provide an additional locking means for the cups 25.

Figure 11:
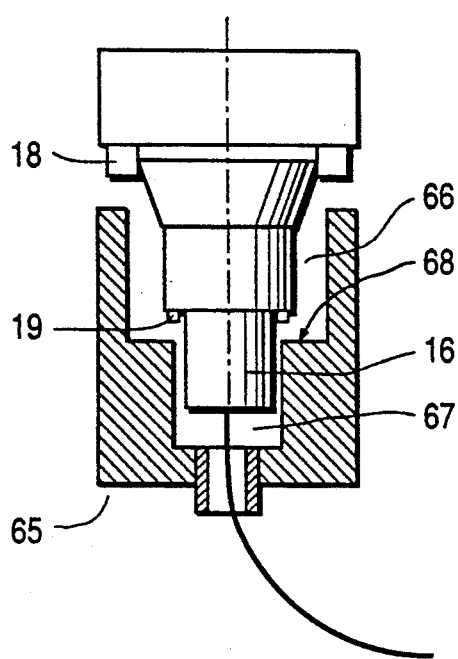
FIG. 11 is a side view of a control rod drive housing support with a radiation shield according to another embodiment of the present invention.

Alternatively, a radiation shield cup 65, as shown in FIG. 11, may be used. The radiation shield cup 65 is provided with a first annular hole 66 and a second annular hole 67. Between the first and second holes 66 and 67 is a ledge 68. In operation, the cup 65 may be provided around the bottom portion 16 of control rod drive 15 with a clearance between the ledge 6 and lower flange bolts 19. In this embodiment, in the case of housing failure the cups support the control rod drive through bolts 19. Accordingly, the control drive can be supported through flange bolts 18 as shown by FIG. 3 or through flange bolts 19 as shown in FIG. 11.

The present invention includes three alternative support bar assemblies to cover various situations around the control rod drive. For example, core detectors may be placed throughout the grid of control rod drives. Specifically Start-up Range Monitors/Intermediate Range Monitors ("SRM/IRM") core detectors and Local Power Range Monitors ("LPRM") core detectors may be provided throughout the grid of control rod drives to monitor the reactor core. While the present invention will be described in connection with SRM/IRM detectors and LPRM detectors, it should be recognized that the invention could also be used in connection with other instruments.

Figure 9A:
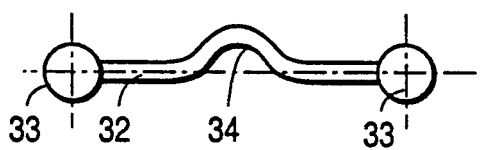
FIG. 9A is a top view of another support bar used with support assembly shown in FIGS. 2 and 3.
Figure 9B:
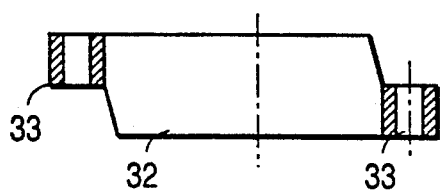
FIG. 9B is a cross-sectional side view of the support bar of FIG. 9A.
Figure 10A:
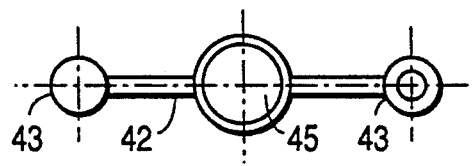
FIG. 10A is a top view of a support bar used with the support assembly of FIGS. 4 and 5.
Figure 10B:
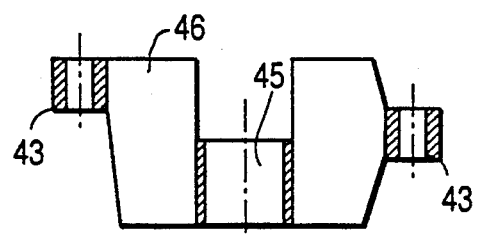
FIG. 10B is a side view of a support bar used with the support assembly of FIGS. 4 and 5.
Figure 10C:
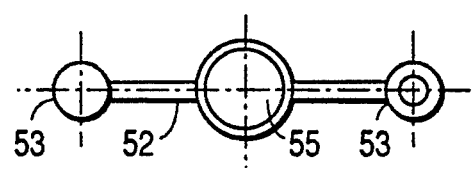
FIG. 10C is a top view of a support bar used with the support assembly of FIGS. 6 and 7.
Figure 10D:
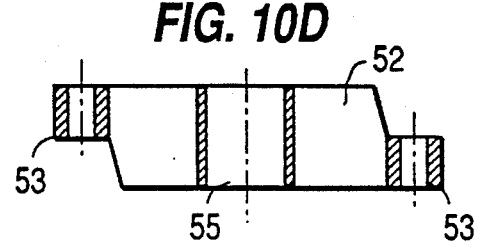
FIG. 10D is a side view of a support bar used with the support assembly of FIGS. 6 and 7.

In FIG. 2, detectors are shown placed throughout the grid of control rods at 30. A detector position support bar 32 may be used at a detector position 30 to support a radiation shield cup and accommodate a detector. As shown in FIGS. 2 and 9A, support bar 32 has a curved portion 35 sized to bend around a detector 30 and hubs 33 for attachment to the hangar rods 11. As shown in FIG. 3, the detector position support bar 32 supports a radiation shield cup 25 without interfering with the detector 30 or its drive 31 and gear box 32. The support bar 32 thereby allows easy service of gear box 36. Further, when a detector is being replaced, the detector can be lowered without removing the detector 30.

The detector position support bars 32 can be used just at the detector positions or can be used at any or all positions in order to standardize the housing support.

Another alternative support bar is shown in FIGS. 4, 5, 10A and 10B. A detector position support bar 42 having hubs 43 for attachment to hangar rods 11 is provided with a throughhole 45. The hole 45 in support bar 42 receives the lower portion of the detector therethrough. An upper portion 46 of hole 45 in the support bar 42 is sized to accommodate the gear box 36 on the detector 30 allowing the support bar 42 to be installed when the detector is already in place.

Figure 7:
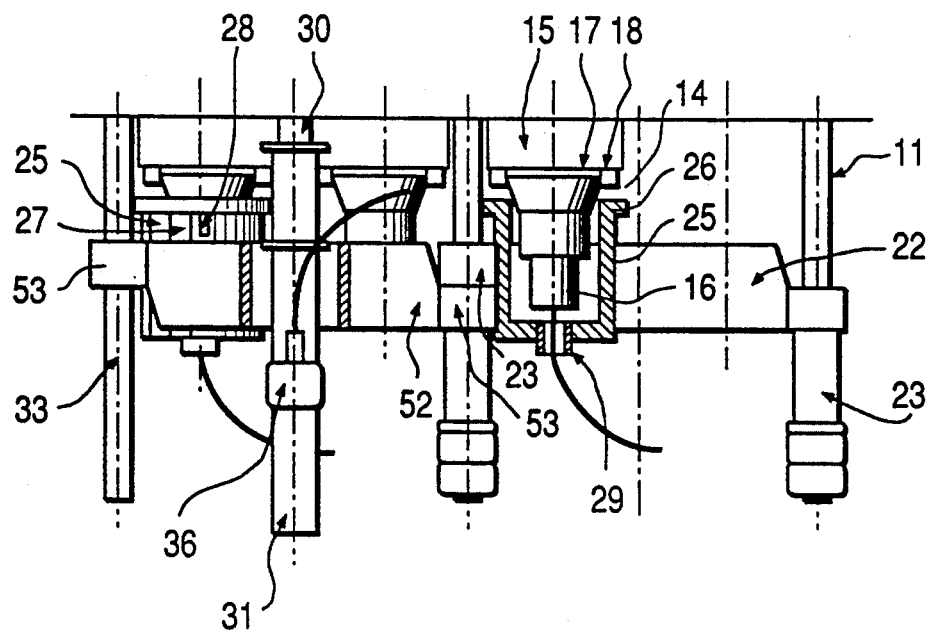
FIG. 7 is a side view of the control rod drive housing supports with the radiation shields of FIG. 6.

Alternatively, as shown in FIGS. 5, 6, 10C and 10D, a support bar 52 with hubs 53 for attachment to hangar rods 11 with a hole 55 may be used. The hole 55 receives the detector 30 therethrough. As shown in FIG. 7, the gear box 36 is below the bottom of the support bar 52 when the support bar 52 is in use allowing the detectors to be removed while the support bar is in place.

Figure 12:
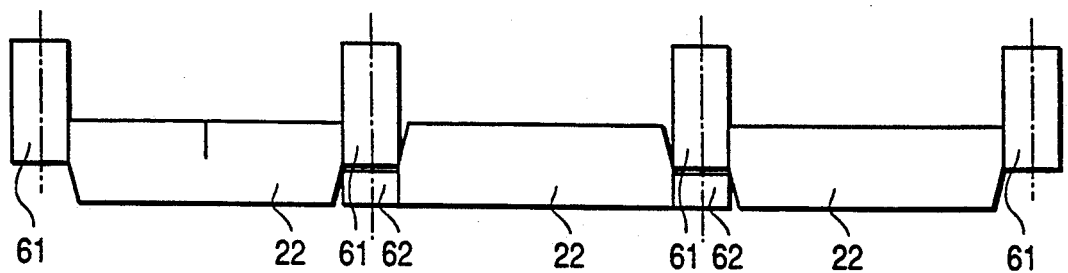
FIG. 12 is a side view of the support bar of the control rod drive housing supports of an embodiment of the present invention.
Figure 13:
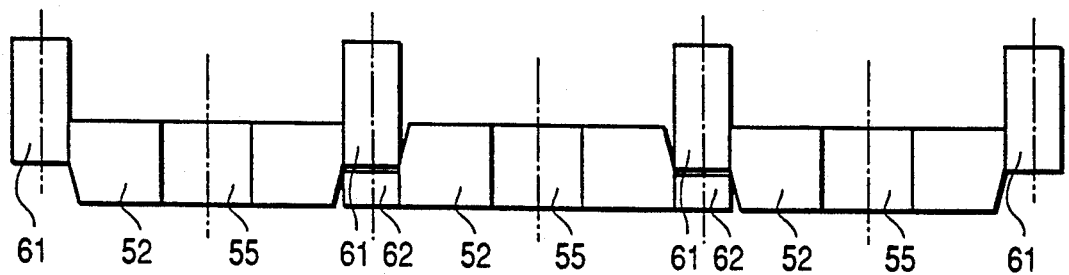
FIG. 13 is a side view of the support bar of the control rod drive housing supports of another embodiment of the present invention.
Figure 14:
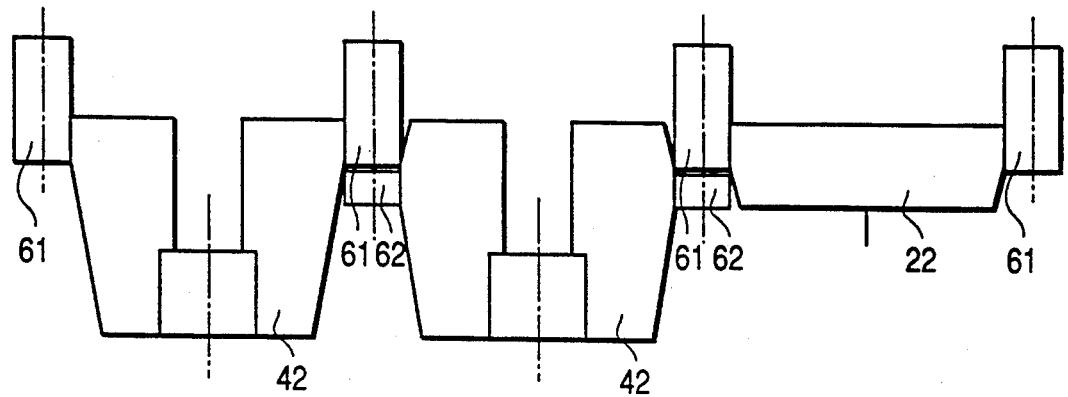
FIG. 14 is a side view of the support bar of the control rod drive housing supports of another embodiment of the present invention.

Alternative support bars for each of the situations described in the above embodiments of the present invention are shown in FIGS. 12, 13 and 14. In the support bar arrangements shown in FIGS. 12, 13 and 14, every other support bar has either an upper or a lower hub. As a result, the total number of support bars used is increased. However, the removal and installation of a specific support is simplified because a maximum of three support bars need be removed in order to access any position. Moreover, for at least half of the positions, only one support bar need be removed. This is to be compared with the main embodiment described above where all the support bars have to be removed from the periphery until the specific bar to be accessed is reached.

FIG. 12 illustrates a row of support bars 22 without any detector positions. The support bars 22 alternately have upper hubs 61 and lower hubs 62. Although not shown, support bars 32 could also be provided with upper and lower hubs. FIG. 13 illustrates a row of support bars with detector positions. The support bars 52 are also shown having alternately, upper hubs 61 and lower hubs 62. FIG. 14 also illustrates a row of support bars with detector positions. Both the support bars 42 and the support bar 22 are shown. The support bars 42 are also shown with upper hubs 61 and lower hubs 62. Thus, the present invention provides easy access to the detectors as well as the control rod drives.

Various combinations of these support bars can be used or as described above one type of support bar can be used for purposes of standardization. With any of these support bars the radiation shields 25 can be easily raised and lowered by the control rod drive removal-/installation machine. Thus, the present invention provides greatly increased radiation protection for persons working under the reactor vessel and increased support of the control rod drive housing while also allowing quick and easy replacement of a control rod drive.

The foregoing description of a preferred embodiment of the invention has been presented for purposes of illustration and description. It is not intended to be exhaustive or to limit the invention to the precise form disclosed. Many modifications and variations are possible in light of the above teaching. The embodiment was chosen and described in order to best explain the principles of the invention and its practical application to thereby enable others skilled in the art to best utilize the invention and various embodiments and with various modifications as are suited to the particular use contemplated. It is intended that the scope of the invention only be limited by the claims appended hereto.

I claim:

1. A support for a control rod drive housing in a boiling water reactor comprising:
   first means for supporting a control rod drive in the case of a housing failure; and
   second means for supporting said control rod drive in the case of a housing failure and shielding persons working under the reactor vessel from radiation, said second means being supported by said first supporting means, and wherein said second means can be automatically raised and lowered from a non-support position where said control rod drive is not supported to a support position where said control rod drive is supported.

2. A control rod drive housing support according to claim 1, wherein said first supporting means comprises a plurality of support members provided in rows on opposing sides of a lower portion of a plurality of control rod drives.

3. A control rod drive housing support according to claim 2, wherein said second supporting means comprises a plurality of support cups, each of said support cups receiving, and shielding a lower portion of said control rod drive and supporting said control rod drive in the case of a housing failure.

4. A control rod drive housing support according to claim 3, wherein each of said support cups have locking means on opposing sides thereof for locking attachment to an adjacent support cup.

5. A control rod drive housing support according to claim 4, wherein said support cups have a third support member on opposing sides thereof, said third support members being supported by said support members to transfer the load of said support cups to said support members.

6. A control rod drive housing support according to claim 5, wherein said support cups have an annular rim for supporting said control rod drive.

7. A control rod drive housing support according to claim 6, wherein said annular rim is at an upper portion of said support cups.

8. A control rod drive housing support according to claim 6, wherein said annular rim is at a middle portion of said support cups.

9. A control rod drive housing support according to claim 2, wherein said support members are straight bars with hubs on each end thereof for attachment to said reactor.

10. A control rod drive housing support according to claim 2, wherein said first support members are bars having hubs at each end thereof for attachment to said control rod drive housing, said bars being curved so as to accommodate equipment placed throughout said control rod drive housing.

11. A control rod drive housing support according to claim 9, wherein said support bars have a hole extending therethrough for receiving and allowing equipment placed throughout said control rod drive housing to pass therethrough.

12. A support for a control rod drive housing in a boiling water reactor comprising:

a plurality of first support members provided in rows on opposing sides of a lower portion of a plurality of control rod drives; and a plurality of second support members supported by said first support members, said second support members supporting said control rod drive in the case of a housing failure and shielding persons working under the reactor from radiation emitted from the reactor, and wherein said second members can be automatically raised and lowered from a non-support position where said control rod drive is not supported to a support position where said control rod drive is supported.

13. A control rod drive housing support according to claim 12, wherein said second support members comprise a plurality of support cups, each of said support cups receiving, and shielding a lower portion of said control rod drive and supporting said control rod drive in the case of a housing failure.

14. A control rod drive housing support according to claim 13, wherein each of said support cups have locking means on opposing sides thereof for locking attachment to an adjacent support cup.

15. A control rod drive housing support according to claim 14, wherein said support cups have a third support member on opposing sides thereof, said third support members being supported by said first support members to transfer the load of said support cups to said first support members.

16. A control rod drive housing support according to claim 15, wherein said support cups have an annular rim for supporting said control rod drive.

17. A control rod drive housing support according to claim 16, wherein said annular rim is at an upper portion of said support cups.

18. A control rod drive housing support according to claim 16, wherein said annular rim is at a middle portion of said support cups.

19. A control rod drive housing support according to claim 12, wherein said support members are straight bars with hubs on each end thereof for attachment to said reactor.

20. A control rod drive housing support according to claim 12, wherein said first support members are bars having hubs at each end thereof for attachment to said control rod drive housing, said bars being curved so as to accommodate equipment placed throughout said control rod drive housing.

21. A control rod drive housing support according to claim 19, wherein said support bars have a hole extending therethrough for receiving and allowing equipment placed throughout said control rod drive housing to pass therethrough.

* * * * *